United States Patent [19]

Casper

[11] 4,248,397
[45] Feb. 3, 1981

[54] CUP HOLDER

[76] Inventor: Raymond C. Casper, 2541 21st St., Cuyahoga Falls, Ohio 44223

[21] Appl. No.: 4,147

[22] Filed: Jan. 17, 1979

[51] Int. Cl.³ .............................................. A47F 5/12
[52] U.S. Cl. ..................... 248/138; 211/81; 248/311.2
[58] Field of Search ............... 248/130, 138, 311.1 R, 248/184, 149; 224/290, 42.45 B, 42.45 R; 211/74, 81; 114/191

[56] References Cited

U.S. PATENT DOCUMENTS

| | | | |
|---|---|---|---|
| 1,112,230 | 9/1914 | Smith | 248/138 |
| 1,386,878 | 8/1921 | Lamp | 211/181 X |
| 2,520,412 | 8/1950 | Jensen | 114/191 X |
| 2,646,955 | 7/1953 | Russell | 248/149 |
| 2,683,640 | 7/1954 | Mangine | 248/311.1 X |
| 2,933,358 | 4/1960 | Sheble et al. | 224/42.46 B X |
| 3,051,428 | 8/1962 | Schult | 248/311.1 X |
| 3,423,571 | 1/1969 | Trachtenberg et al. | 248/311.1 X |
| 3,458,095 | 7/1969 | Stall | 224/42.45 R |
| 3,658,219 | 4/1972 | Ordt | 224/42.45 R |
| 3,707,272 | 12/1972 | Rasmussen | 248/311.1 |
| 3,761,044 | 9/1973 | Ahmer | 248/311.1 |
| 3,840,204 | 10/1974 | Thomas et al. | 248/311.1 |
| 3,842,981 | 10/1974 | Lambert | 224/42.45 R X |
| 3,986,445 | 10/1976 | Hooton | 211/181 X |

FOREIGN PATENT DOCUMENTS 274901  6/1914  Fed. Rep. of Germany ........... 248/138

Primary Examiner—J. Franklin Foss
Attorney, Agent, or Firm—Hamilton, Renner & Kenner

[57] ABSTRACT

A device for holding a cup (C) and maintaining liquid in the cup (C) while travelling in a vehicle includes a device (10, 100) for carrying the cup (C). The cup holding device (10, 100) is carried by a support member (20, 110) in such a manner so as to permit rotation of the cup holding device (10, 100) on a first axis. A stand (30, 40, 50, 120, 130, 140) carries the support member (20, 110) in such a manner so as to permit rotation thereof on a second axis generally 90° of the first axis. The stand (30, 40, 50, 120, 130, 140) is adapted for mounting at a desired location in the vehicle. The cup (C) is thus free to act under its own inertia to maintain the liquid therein.

17 Claims, 6 Drawing Figures

CUP HOLDER

TECHNICAL FIELD

This invention relates to a device for holding a cup or the like in a vehicle. More particularly, this invention relates to a device which will maintain the liquid in the cup without spilling in a moving vehicle and is adapted to be positioned at a variety of locations within the vehicle.

BACKGROUND ART

The vehicular traveler, particularly the long distance vehicular traveler, often enjoys a beverage while traveling. In such instances it is not always desirable or safe, particularly for the operator of the vehicle, to be forced to continually hold the beverage container. Because there are usually no flat surfaces in a vehicle for resting the container and even where such a surface exists there is nothing to avoid spillage of the beverage, a rigid cup-holding structure has been developed to provide a receptacle for the container. Such a device can rest or attach to some portion of the vehicle and provides a means to prevent the container from tipping. However, nothing prevents the liquid from spilling out of the container due to sudden stops, starts or turns of the vehicle or even spillage due to travelling over uneven terrain.

In some types of vehicles, generally of the recreational vehicle variety which have an excess of accessory space and where aesthetics are not stressed, a cup holder has been provided which prevents at least some spillage. There a permanently mounted bar extends from some surface, such as the door or dashboard, and carries a yoke which swingly suspends a cup-holding structure. However, such a device, being permanent and space consuming, would not be practical for all vehicles. In addition, its rigidity and permanency presents a safety hazard upon impact.

DISCLOSURE OF THE INVENTION

It is thus a primary object of the present invention to provide a device for holding a cup or the like in a vehicle and maintaining it from spilling the liquid therein regardless of the forces applied thereto as the vehicle is in motion.

It is another object of the present invention to provide a device, as above, which is temporarily mountable at a variety of locations within the vehicle.

It is a further object of the present invention to provide a device, as above, which will hold a variety of sizes of containers.

It is yet another object of the present invention to provide a device, as above, which will not cause injury to an occupant of the vehicle should there be an impact.

These and other objects of the present invention, which will become apparent from the description to follow, are accomplished by the means hereinafter described and claimed.

In general, the apparatus which maintains liquid in a cup while travelling in a vehicle includes holding means for carrying the cup and support means for carrying the cup holding means and permitting rotation of the cup holding means on a first axis. A stand carries the support means and permits rotation thereof on another axis approximately ninety degrees of the first axis so that the cup is free to act under its own inertia to maintain the liquid therein.

PREFERRED EMBODIMENTS FOR CARRYING OUT THE INVENTION

Figure 1:
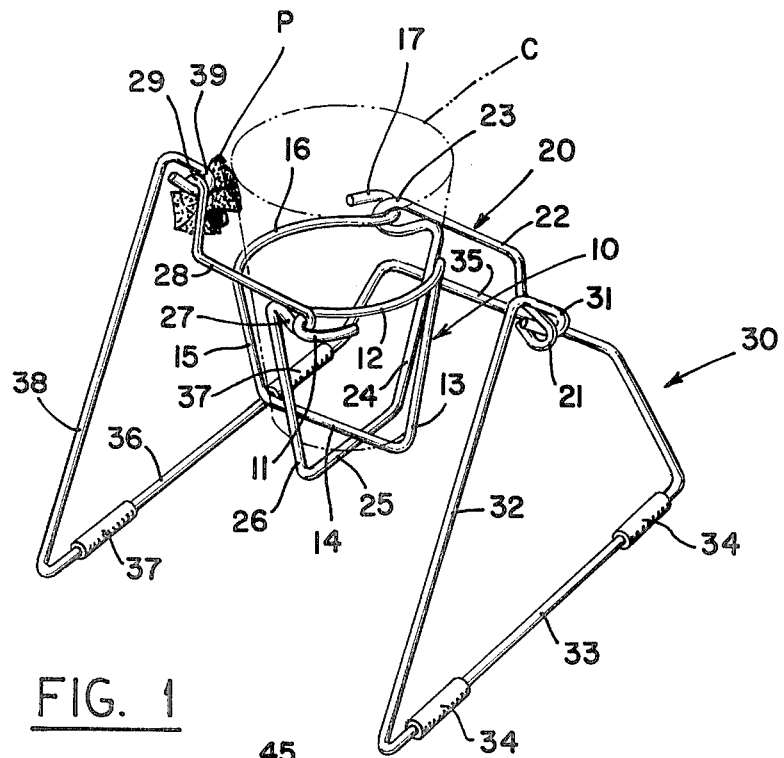
FIG. 1 is a perspective view of the cup holding device according to the concept of the present invention shown with a stand for resting on a console or transmission housing in a vehicle.

As shown in the embodiment of FIG. 1, a cup holding device, generally indicated by the numeral 10, can be formed from one continuous piece of wire, such as a nine gauge wire, which could be coated with a rubber or vinyl material. Holding device 10 has at one end thereof a first hook portion 11. A first arcuate portion 12, generally in the shape of an arc of a circle defining a portion of the circumference of a cup C, extends from first hook portion 11 to a first generally vertically directed portion 13 which generally parallels the outer surface of the cup C. The lower extent of first generally vertically directed portion 13 of the continuous cup holding device 10 curves into a generally horizontal cup confining or resting portion 14 upon which the bottom of the cup C may rest. Extending upwardly from the other end of horizontal portion 14 is a second generally vertically directed portion 15, which like portion 13, generally parallels the outer surface of cup C. Portion 15 terminates at its upper extent in a second arcuate portion 16 generally in the shape of an arc of a circle defining a portion of the circumference of cup C. It is preferred that portions 12 and 16 be slightly more closely spaced than the size of most standard cups or beverage cans so that when a cup or the like is placed therebetween, they will expand due to their wire construction and firmly grasp and otherwise confine cups of a variety of sizes. Second arcuate portion 16 and cup holding device 10 terminate in a second hook portion 17. As will hereinafter become evident, hook portions 11 and 17 represent pivot points which together define a first axis about which the cup may pivot or swing. As shown in FIG. 1 this first axis is generally parallel to the direction of travel of the vehicle permitting movement of the cup in a direction generally transverse to the direction of travel of the vehicle.

A support device which carries holding device 10 is generally indicated by the numeral 20 in FIG. 1 and like cup holding device 10, can be formed from one continuous piece of suitable wire, such as the nine gauge wire previously described. Support device 20 includes a first hook portion 21 at one end thereof. A generally horizontal first cross support 22 extends from hook portion 21 and terminates in a first loop 23 which is designed to engage hook portion 17 of holder 10. Loop 23 closes back against support 22 with a first generally vertically directed portion 24 extending downwardly therefrom to a point lower than horizontal cup restraining portion 14 of holder 10. A horizontal portion 25 extends from the lower end of portion 24, beneath cup restraining portion 14 and terminates with a second generally vertically directed portion 26 extending upwardly therefrom. At the uppermost extent of portion 26 is a second loop 27 which is closed against and extends into a second generally horizontal cross support 28. Loop 27 is designed to engage hook portion 11 of holder 10. Cross support 28 and support device 20 terminate in a second hook portion 29. As will hereinafter become evident, hook portion 21 and 29 represent pivot points which together define a second axis about which the cup may pivot or swing. As shown in FIG. 1, this second axis is generally transverse to the direction of travel of the vehicle permitting movement of the cup in a direction generally parallel to the direction of travel of the vehicle.

The support device 20 and thus indirectly the cup holding device 10 are carried by a supporting stand member, one form of which is shown in FIG. 1 and indicated generally by the numeral 30. Stand 30 can be formed from one continuous piece of suitable wire, such as the nine gauge wire previously described, and starts at one end as a first hook member 31 designed to engage hook portion 21 of support device 20. A first leg member 32 extends angularly downward from hook portion 21 and turns at its lower end to form a generally horizontal first foot member 33 having friction pads 34 of rubber or some other suitable material. A connecting brace 35, of essentially the shape of an inverted U, extends from the other end of first foot member 33 to a second generally horizontal foot member 36 having friction pads 37 thereon. A second leg member 38 extends upwardly from second foot member 36 and it, as well as supporting stand member 30, terminates at its upward extent at a second hook member 39. Hook member 39 is designed to engage hook portion 29 of support device 20.

Stand member 30 is particularly adapted to rest on a floor console or transmission housing of a vehicle. If the vehicle is equipped with a floor console of the type having a substantially flat top surface, foot members 33 and 36 and in particular pads 34 and 37 would rest on the console, with the latter preventing stand 30 from sliding due to sudden acceleration or deceleration of the vehicle. If the vehicle is not equipped with a floor console, but rather has only the conventional somewhat rounded transmission housing on the floor adjacent the driver, legs 33 and 36 and pads 34 and 37 can either rest on or somewhat straddle the rounded housing. The flexible nature of the stand permits solid resting on transmission housings of various sizes. The inverted U-shape of connecting brace 35 accomodates the housing within its confines.

Whether resting on a console or the transmission housing, stand 30 carries support device 20 which in turn carries cup holding device 10 as previously described. The liquid in the cup or whatever container is being held will be horizontal regardless of the inclination of the stand due to the two axis rotation previously described which would allow the cup to essentially hang vertically. Then if the vehicle were to accelerate or decelerate quickly, support 20 would swing on the axis defined by hook portions 21 and 20 and hook portions 31 and 39 with the cup acting under its own inertia to maintain the liquid therein. Similarly, a sharp turn of the vehicle may cause the cup holder 10 to swing on the axis defined by hook portions 11 and 17 and loops 23 and 27. Uneven road conditions or steep grades in the road are similarly accounted for. It should be noted that it has been found that the wire to wire frictional engagement provides for free rotation of the components. If for some reason there would not be enough friction such that the cup would overreact to any movement thereby possibly causing spillage, any of the members joining at the points of rotation could be provided with a foam-like coating or pad, one such pad P being shown in FIG. 1, to increase the frictional forces.

Figure 2:
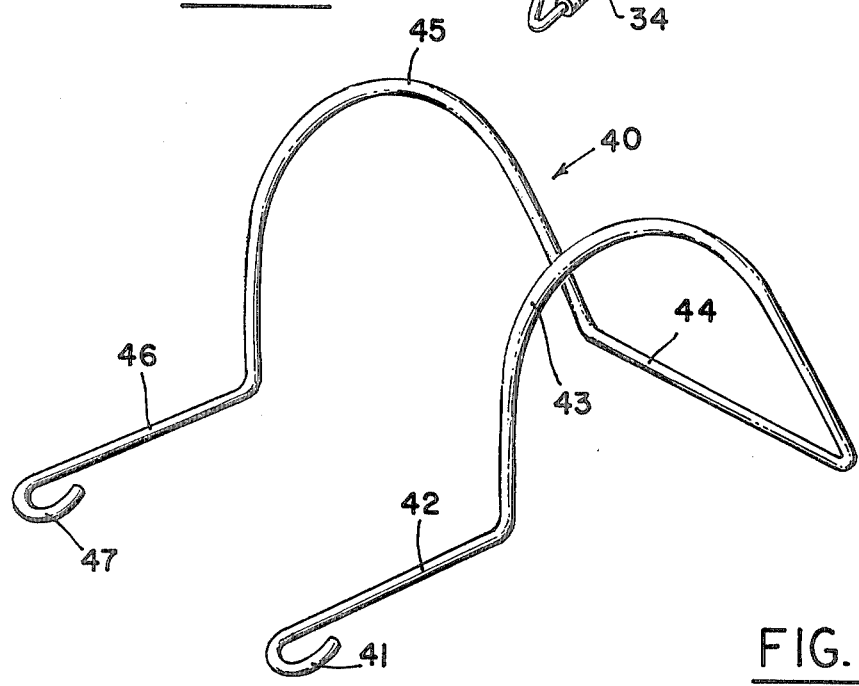
FIG. 2 is a perspective view of a stand for hanging over the seat of a vehicle.

An alternate stand member is shown in FIG. 2 and depicted generally by the numeral 40. This stand member is suited for hanging on the seat of a vehicle and carries a support device 20 and cup holder 10 identical to that depicted and described in conjunction with FIG. 1. Stand member 40 can be formed from a continuous piece of suitable wire, as previously described, and starts at one end as a first hook portion 41 which extends into a first generally horizontal arm or extension 42. A first arcuate seat engaging portion 43 continues from extension 42 and is connected by cross member 44 to a second arcuate seat engaging portion 45. A second generally horizontal arm or extension 46 continues from the end of arcuate portion 45 and stand 40 and extension 46 terminate in a second hook portion 47. Thus, hook portions 41 and 47 are adapted to engage hook portions 21 and 29 of support device 20 and due to extensions 42 and 46, the cup may be suspended away from the seat of the vehicle. Due to the resilient nature of arcuate portions 43 and 45, stand member 40 will fit in vehicles having a variety of sized seats.

Figure 3:
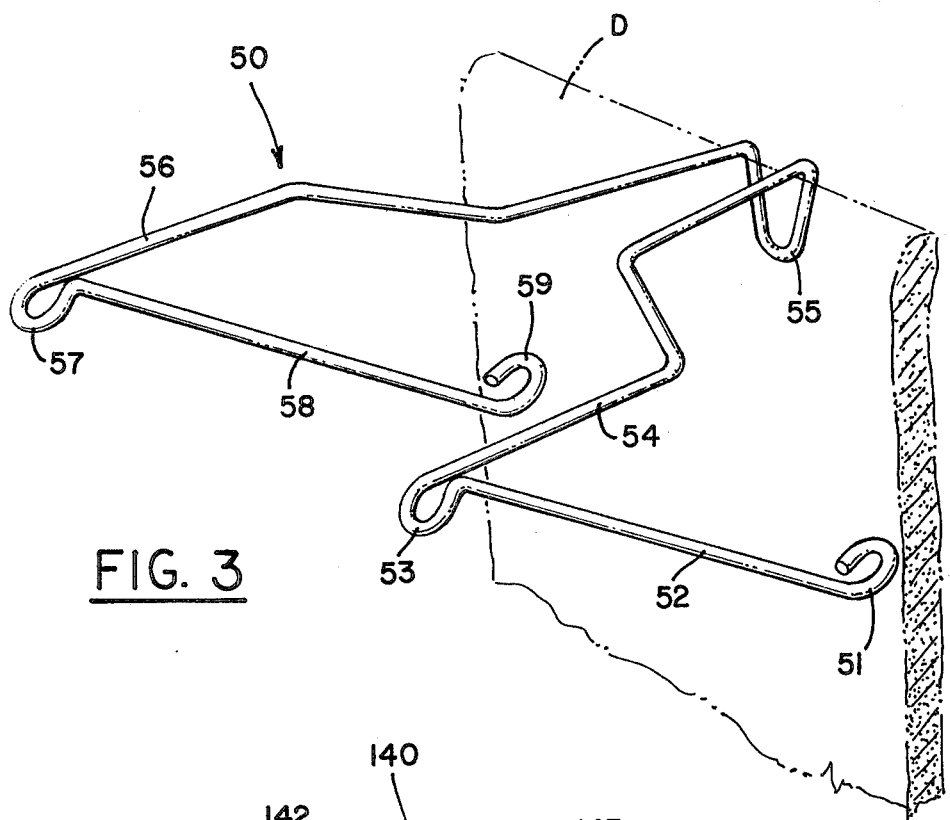
FIG. 3 is a perspective view of a stand for hanging on the door of a vehicle.

Another alternate stand member is shown in FIG. 3 and depicted generally by the numeral 50. This stand member is suited for hanging on the door or window of a vehicle and is shown in FIG. 3 in conjunction with a portion of a vehicle door D just below the window. Stand member 50 carries a support device 20 and cup holder 10 identical to that depicted and described in conjunction with FIG. 1 and can be formed from a continuous piece of suitable wire, as previously described. Stand member 50 starts with a first curved portion 51 which rests against the door D. Portion 51 is curved merely to prevent damage to the interior of the door which might otherwise occur if the end of the wire were to rest against the door. Portion 51 continues into a first support leg 52 which extends angularly upward from portion 51 and has a first loop 53 at the upper end thereof. Loop 53 continues into a first generally S-shaped support arm portion 54 which extends substantially horizontally back toward the door and terminates in a door mounting hook 55. Hook 55 is adapted to fit in the space between the interior of the door and the glass of the window. Hook 55 continues as a second generally S-shaped support arm portion 56 which extends substantially horizontally outward from the door and terminates at a second loop 57 at the outer end thereof. A second support leg 58 extends angularly from loop 57 toward door D and stand 50 and leg 58 terminate as a second door engaging curved portion 59. Thus, loops 53 and 57 are adapted to engage hook portions 21 and 29 of support device 20 to provide the required pivotal support away from door D. It should be noted that in the embodiment of FIG. 3 the first axis, as previously defined, is generally transverse to the direction of movement of the vehicle and the second axis, as previously defined, generally parallels the vehicular movement. Nevertheless, the same pivotal movement as described in the embodiments of FIGS. 1 and 2 is assured.

Figure 6:
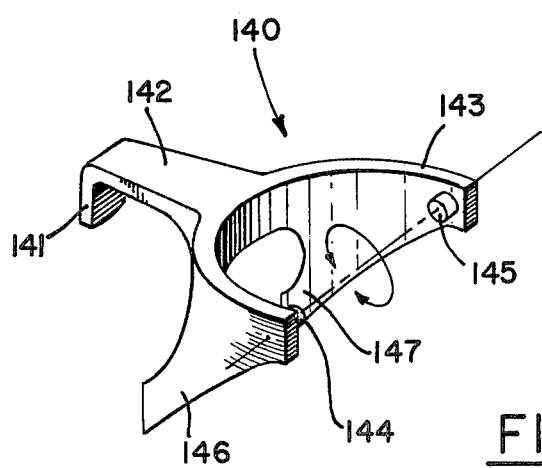
FIG. 6 is a perspective view of a stand for the embodiment of FIG. 4 for hanging on the door of a vehicle.
Figure 4:
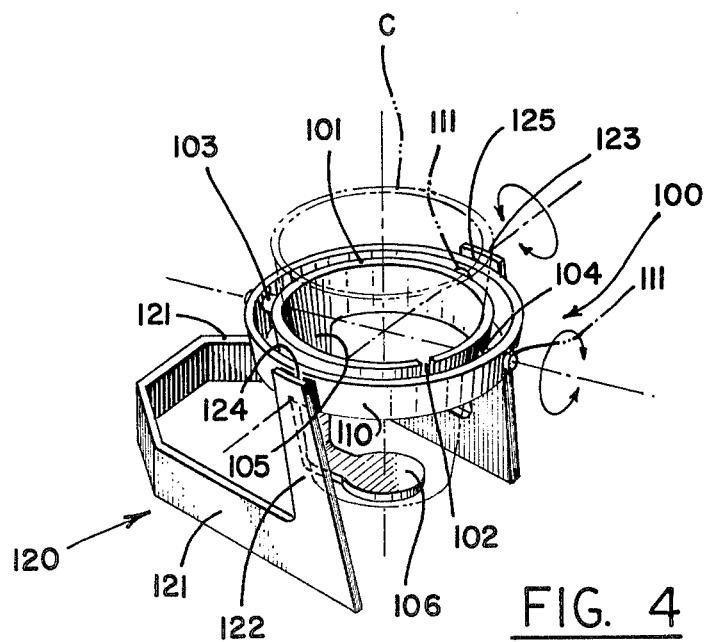
FIG. 4 is a perspective view of an alternate embodiment of the cup holding device according to the concept of the present invention shown with a stand for resting on a console or transmission housing in a vehicle.
Figure 5:
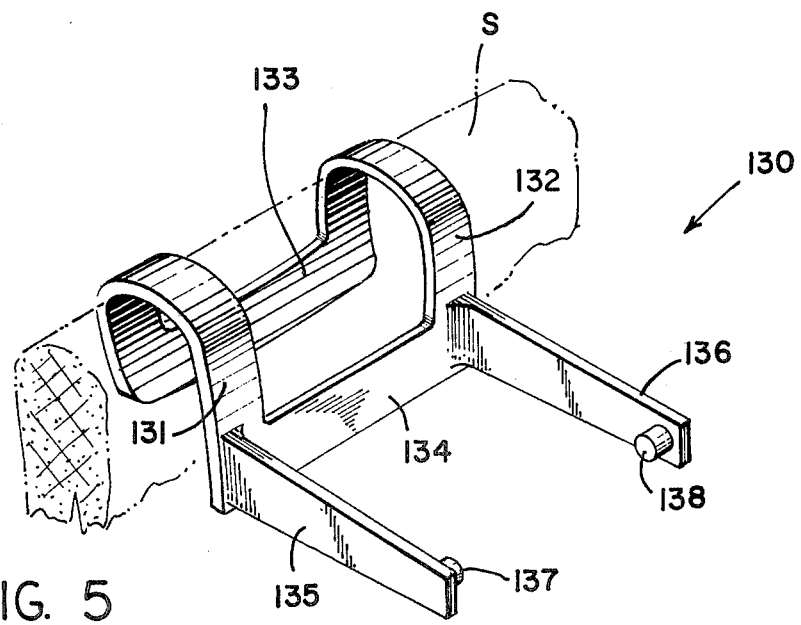
FIG. 5 is a perspective view of a stand for the embodiment of FIG. 4 for hanging over the seat of a vehicle.

An alternate embodiment to the cup holding device of FIGS. 1-3, inclusive, is shown in FIGS. 4-6, inclusive, and indicated generally by the numeral 100 in FIG. 4. The components of holding device 100 are of a plastic material and include a generally circular ring member 101 of a diameter generally corresponding to that of a standard cup C, beverage can or the like. Ring member 101 can be continuous, or as shown can have an interruption, as at 102, for expansion to accommodate and confine cups of slightly varying sizes. Ring member 101 includes two pins 103 and 104 which extend radially outward therefrom at diametrically opposite positions. As will hereinafter become evident, pins 103 and 104 represent pivot points which together define a first axis about which cup C may pivot or swing. As shown in FIG. 4, this first axis is generally parallel to the direction of travel of the vehicle permitting movement of the cup in a direction generally transverse to the direction of travel of the vehicle. A tongue 105 extends vertically downward from ring 101 and carries a generally horizontal shelf 106 upon which cup C may rest.

A support device which carries ring 101 is shown in the form of a collar 110 of a plastic material and of a diameter slightly larger than the diameter of ring 101. Collar 110 is provided with four equally circumferentially spaced apertures 111. Two diametrically opposed apertures 111 receive pins 103 and 104 therein such that ring member 101 may rotate on the first axis previously described. The other two diametrically opposed apertures 111 define a second axis for pivoting of the cup, this axis being 90° of the first axis and shown as being generally transverse to the direction of travel of the vehicle thereby permitting movement of the cup in a direction generally parallel to the direction of travel of the vehicle.

Collar 110 is carried by a supporting stand member, one form of which is shown in FIG. 4 and indicated generally by the numeral 120. Stand member 120, which can be formed of a plastic material, includes a generally U shaped base or feet 121. If necessary, feet 121 may be provided with friction pads such as pads 34 and 37 shown in FIG. 1. Extending upward from the tips of the U of base 121 are generally vertical supports or legs 122 and 123. Pins 124 and 125 are formed near the top of supports 122 and 123, respectively, extend inward toward each other to define the second axis, previously described, and are received in two of the apertures 111 of collar 110. Thus, rotation of collar 110 on the second axis is permitted.

Stand member 120 is particularly adapted to rest on a floor console or transmission housing of a vehicle. If the vehicle is equipped with a floor console of the type having a substantially flat top surface, base 121 will rest thereon. If the vehicle has only the conventional somewhat rounded transmission housing on the floor adjacent the driver, the generally parallel legs of the U-shaped base will somewhat straddle the rounded housing. Thus, a cup C may be carried in a manner described in conjunction with the embodiment of FIG. 1.

An alternate plastic stand member for carrying collar 110 is shown in FIG. 5 and indicated generally by the numeral 130. Like the embodiment of FIG. 2, this stand is suited for hanging on a seat S of a vehicle and includes two arcuate seat engaging portions 131 and 132 interconnected by cross members 133 and 134 at each end thereof. Two arms 135 and 136 extend outwardly from portions 131 and 132, respectively, and are provided with pins 137 and 138, respectively, near the outer end thereof. These pins define the second axis, previously described, and are received in two of the apertures 111 of collar 110. Thus, rotation of collar 110 on the second axis is permitted and the cup C may be freely suspended away from the seat S.

Another alternate plastic stand member is shown in FIG. 6 and indicated generally by the numeral 140. Like the embodiment of FIG. 3, this stand is suited for hanging on a door of a vehicle and, as such, includes a hook portion 141 which is received in the space between the interior of the door and the glass of the window. Hook portion 141 terminates in a generally horizontal arm 142 extending outwardly from the door of the vehicle. At the outer end of arm 142 is a semi-circular arcuate arm portion 143 which is provided near the ends thereof, with pins 144 and 145. Support legs 146 and 147 also extend generally from the ends of arcuate portion 143 back to the door. Pins 144 and 145 together define the second axis, previously described, and are received in two of the apertures 111 of collar 110 to permit rotation of cup C on the second axis at a position away from the door of the vehicle. As in the embodiment of FIG. 3, the direction of the first and second axis is reversed from that of the stands of FIGS. 4 and 5. It should also be noted that in the FIGS. 4-6, inclusive, embodiment, collar 111 could be provided with pins instead of apertures with the mating members being provided with apertures instead of pins without departing from the spirit of the invention.

It should thus be evident that a cup holding device, as described herein, will maintain liquid in the cup while travelling in a vehicle, and can be readily situated in multiple locations within the vehicle thereby substantially improving the art.

I claim:

1. Apparatus for maintaining liquid in a cup or the like while travelling in a vehicle comprising holding means of a continuous wire construction shaped to grasp and confine the cup, said holding means terminating on both ends in a hook portion, support means of a continuous wire construction having two internal loops to accept said hook portions of said holding means in order to carry said holding means and permit rotation of said holding means on a first axis defined by said hook portions on said holding means and said internal loops on said support means, said support means terminating on both ends in a hook portion, and stand means adapted to engage a portion of the vehicle, said stand means including two pivot points positioned in order to accept said hook portions of said support means and permit rotation of said support means on a second axis which is defined by the pivot points on said stand means and the hook portions of said support means, said second axis being approximately ninety degrees of said first axis so that the cup is free to act under its own inertia to maintain the liquid in the cup.

2. Apparatus according to claim 1 wherein said continuous wire construction of said cup holding means includes means extending around the cup to confine the same.

3. Apparatus according to claim 2 wherein said means extending around the cup is expandable to accommodate cups of varying sizes.

4. Apparatus according to claim 2 wherein said continuous wire construction of said cup holding means further includes means to support the bottom of the cup.

5. Apparatus according to claim 1 wherein said pivot points of said stand means are hook members.

6. Apparatus according to claim 1 wherein said stand means is adapted to be positioned in the vehicle so that one said axis is substantially in the direction of travel of the vehicle.

7. Apparatus according to claim 1 wherein said stand means is selectively adaptable to engage the vehicle by resting on a console of a vehicle and a transmission housing of a vehicle.

8. Apparatus according to claim 7 wherein said stand means includes generally horizontal foot members for engagement of said stand means with the vehicle.

9. Apparatus according to claim 8 wherein said stand means further includes pad means on said foot members to increase the frictional engagement of said stand means with the vehicle.

10. Apparatus according to claim 8 wherein said stand means further includes leg members extending upwardly from said foot members, said leg members having said pivot points thereon defining said second axis and carrying said support means so that the cup is suspended away from the vehicle.

11. Apparatus according to claim 1 wherein said stand means includes engaging means thereon adapted to attach to a seat of the vehicle.

12. Apparatus according to claim 11 wherein said engaging means is expandable to accommodate seats of varying sizes.

13. Apparatus according to claim 11 wherein said stand means further includes arm means extending generally horizontally of said engaging means, said arm means having said pivot points thereon defining said second axis and carrying said support means so that the cup is suspended away from the seat of the vehicle.

14. Apparatus according to claim 1 wherein said stand means includes means to engage the door of a vehicle.

15. Apparatus according to claim 14 wherein said stand means further includes arm means extending generally horizontally outward from said means to engage the door, said arm means having said pivot points thereon defining said second axis and carrying said support means so that the cup is suspended away from the door of the vehicle.

16. Apparatus according to claim 15 wherein said stand means further includes stand support means extending from near the end of said arm means to the door of the vehicle.

17. Apparatus according to claim 1 further comprising pad means at at least one of said pivot points to increase the frictional forces at said pivot points.

* * * * *